United States Patent
Shimizu et al.

(10) Patent No.: US 10,599,118 B2
(45) Date of Patent: Mar. 24, 2020

(54) SCREEN INFORMATION GENERATION DEVICE

(71) Applicant: JTEKT CORPORATION, Osaka-shi (JP)

(72) Inventors: Akihiro Shimizu, Kariya (JP); Terukazu Senda, Obu (JP)

(73) Assignee: JTEKT CORPORATION, Osaka-shi (JP)

(*) Notice: Subject to any disclaimer, the term of this patent is extended or adjusted under 35 U.S.C. 154(b) by 187 days.

(21) Appl. No.: 15/154,009

(22) Filed: May 13, 2016

(65) Prior Publication Data
US 2016/0334981 A1 Nov. 17, 2016

(30) Foreign Application Priority Data

May 13, 2015 (JP) .................................. 2015-098421

(51) Int. Cl.
*G05B 19/05* (2006.01)
*G06F 3/0481* (2013.01)
*G06F 3/048* (2013.01)

(52) U.S. Cl.
CPC .. *G05B 19/056* (2013.01); *G05B 2219/13052* (2013.01); *G06F 3/048* (2013.01); *G06F 3/04817* (2013.01)

(58) Field of Classification Search
CPC ...... G05B 19/056; G05B 19/042; G06F 3/048
See application file for complete search history.

(56) References Cited

U.S. PATENT DOCUMENTS

| 4,570,217 A * | 2/1986 | Allen ........................ G06F 1/14 700/83 |
| 5,644,487 A * | 7/1997 | Duff ..................... G05B 19/056 700/56 |
| 2009/0193362 A1* | 7/2009 | DeMers .............. G06F 3/04817 715/835 |

(Continued)

FOREIGN PATENT DOCUMENTS

| JP | 09-292942 | 11/1997 |
| JP | 11-015522 | 1/1999 |
| JP | 2006-285496 A | 10/2006 |

(Continued)

OTHER PUBLICATIONS

Office Action dated Mar. 5, 2019 in Japanese Application No. 2015-098421, along with an English translation.

*Primary Examiner* — Sherrod L Keaton
(74) *Attorney, Agent, or Firm* — Oblon, McClelland, Maier & Neustadt, L.L.P.

(57) ABSTRACT

A screen information generation device generates screen information indicating display content of a display device connected to a programmable controller that controls a control object device according to a chart program indicating execution order of a plurality of steps each provided per operation unit. When generating the screen information of an individual-manipulation screen for use in individually operating the control object device per operation unit, the screen information generation device is configured to generate the screen information based on the chart program such that a plurality of operation buttons that respectively correspond to the plurality of steps is displayed on the display device.

12 Claims, 6 Drawing Sheets

(56) References Cited

U.S. PATENT DOCUMENTS

| | | | |
|---|---|---|---|
| 2013/0006396 A1* | 1/2013 | Kito | G05B 19/4093 700/83 |
| 2016/0196118 A1* | 7/2016 | Udou | G05B 19/0426 717/109 |

FOREIGN PATENT DOCUMENTS

| | | |
|---|---|---|
| JP | 2007-95081 | 4/2007 |
| JP | 2008-97079 | 4/2008 |
| JP | 2009-080737 A | 4/2009 |

* cited by examiner

FIG. 5

| | | |
|---|---|---|
| ST001 | COMMENT | FORWARD-BACKWARD UNIT ADVANCING OPERATION |
| | ADDRESS OF EXECUTED CONTACT | Y101 |
| | REVERSE-OPERATION STEP | ST005 |
| ST002 | COMMENT | UPWARD-DOWNWARD UNIT ASCENDING OPERATION |
| | ADDRESS OF EXECUTED CONTACT | Y102 |
| | REVERSE-OPERATION STEP | ST004 |

FIG. 6

PROCESS 1   ST001

STEP NUMBER   001

COMMENT: FORWARD-BACKWARD UNIT ADVANCING OPERATION

EXECUTED CONTACT ADDRESS: Y101

REVERSE-OPERATION STEP NUMBER: ST005
- ST002
- ST003
- ST004
- ST005

OK

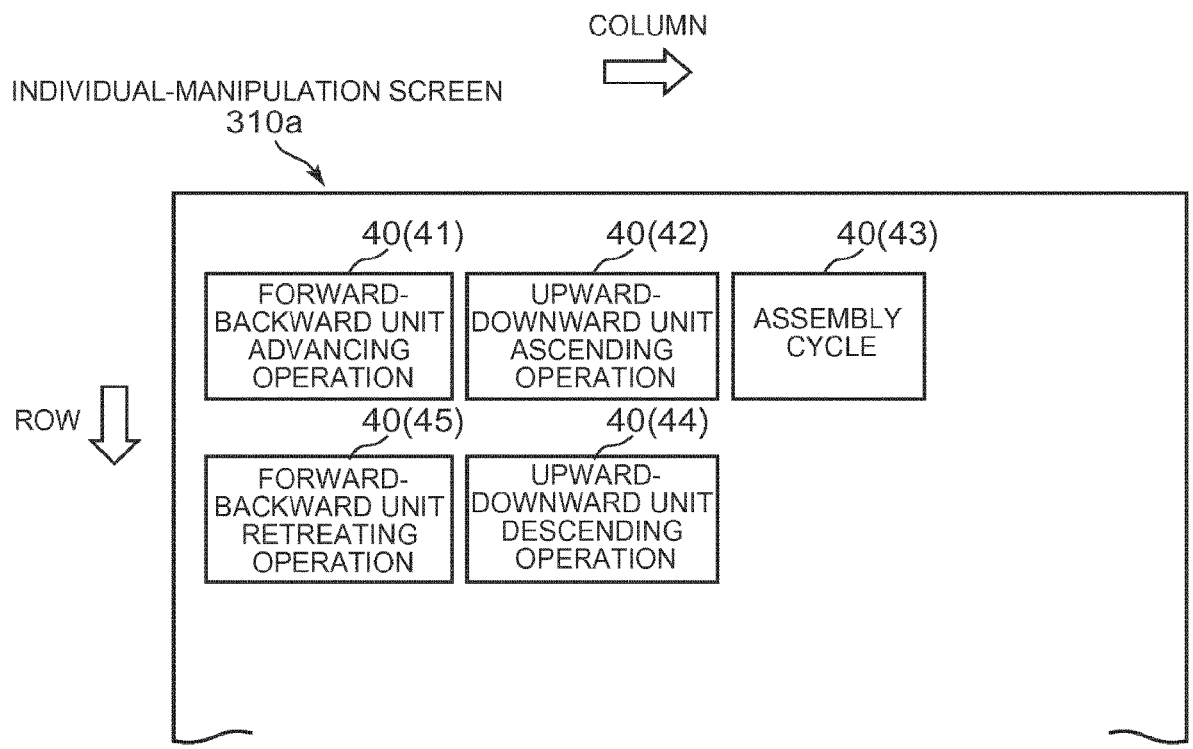

SCREEN INFORMATION GENERATION DEVICE

INCORPORATION BY REFERENCE

The disclosure of Japanese Patent Application No. 2015-098421 filed on May 13, 2015 including the specification, drawings and abstract is incorporated herein by reference in its entirety.

BACKGROUND OF THE INVENTION

1. Field of the Invention

The invention relates to a screen information generation device that generates screen information indicating display content of a display device connected to a programmable controller that controls a control object device according to a chart program indicating the execution order of a plurality of steps each provided per operation unit.

2. Description of Related Art

Conventionally, as an operation panel for operating a facility such as a machine tool, there is one provided with a display device that can be touch-operated by an operator (see, e.g. Japanese Patent Application Publication No. 2007-95081 (JP 2007-95081 A)). This display device is connected to a programmable controller configured to control the facility according to a control program created by a programmer, acquires various information from the programmable controller and displays such information.

Screens to be displayed on such a display device include an operating state display screen that displays an operating state of the facility, an abnormality display screen that displays abnormality content upon failure of the facility, an individual-manipulation screen for carrying out an individual manipulation that operates the facility per operation unit, and so on. These screens are each displayed based on, for example, screen information whose display content is defined by the programmer.

On the individual-manipulation screen among these screens, a plurality of operation buttons each provided per operation unit of the facility are displayed. When the operator touch-operates any one of these operation buttons, an operation of the operation unit corresponding to the touch-operated operation button is performed.

In recent years, a control program is created by a sequential function chart (SFC) that expresses an operation unit of a facility by a unit of step and indicates the execution order of a plurality of steps like a flowchart (see, e.g. Japanese Patent Application Publication No. 2008-97079 (JP 2008-97079 A)). A programming language in the form of such a sequential function chart is defined as the SFC language in the IEC61131-3 standard.

If the operating state display screen in the display device is displayed using a chart program described by the SFC language, it is possible to easily produce screen information for the operating state display screen and to simply display an operating state of the facility. Even in the case where the facility is stopped on the way due to some abnormality during an automatic operation, it is possible to easily grasp the situation.

Among the screens to be displayed on the display device, the individual-manipulation screen is particularly difficult to standardize and thus screen information thereof should be separately produced according to a specification of the facility, and therefore, its workload is large.

SUMMARY OF THE INVENTION

The invention of this application provides a screen information generation device that is able to reduce the workload when producing screen information of an individual-manipulation screen for use in operating a control object device per operation unit.

An embodiment of the invention is a screen information generation device that generates screen information indicating display content of a display device connected to a programmable controller that controls a control object device according to a chart program indicating the execution order of a plurality of steps each provided per operation unit. When generating the screen information of an individual-manipulation screen for use in individually operating the control object device per operation unit, the screen information generation device is configured to generate the screen information based on the chart program such that a plurality of operation buttons that respectively correspond to the plurality of steps is displayed on the display device.

According to the screen information generation device according to the embodiment described above, it is possible to reduce the workload when producing the screen information of the individual-manipulation screen for use in operating the control object device per operation unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is an explanatory diagram showing one example of related information stored in a storage unit of the computer;

FIG. 6 is an explanatory diagram showing one example of a dialog box for setting related information of a chart program;

FIG. 7 is an explanatory diagram showing one example of an individual-manipulation screen that is displayed on a display screen of a display based on screen information generated by the execution of a second application program by an arithmetic processing unit; and FIG. 8 is an explanatory diagram showing one example of the content of screen information in a table format.

DETAILED DESCRIPTION OF EMBODIMENTS

Hereinbelow, an embodiment of the invention will be described with reference to FIGS. 1 to 8. The embodiment shown below is given as a preferred specific example for carrying out the invention and includes portions specifically exemplifying various technical matters that are technically preferable, but the technical scope of the invention is not limited to this specific aspect.

Figure 1:
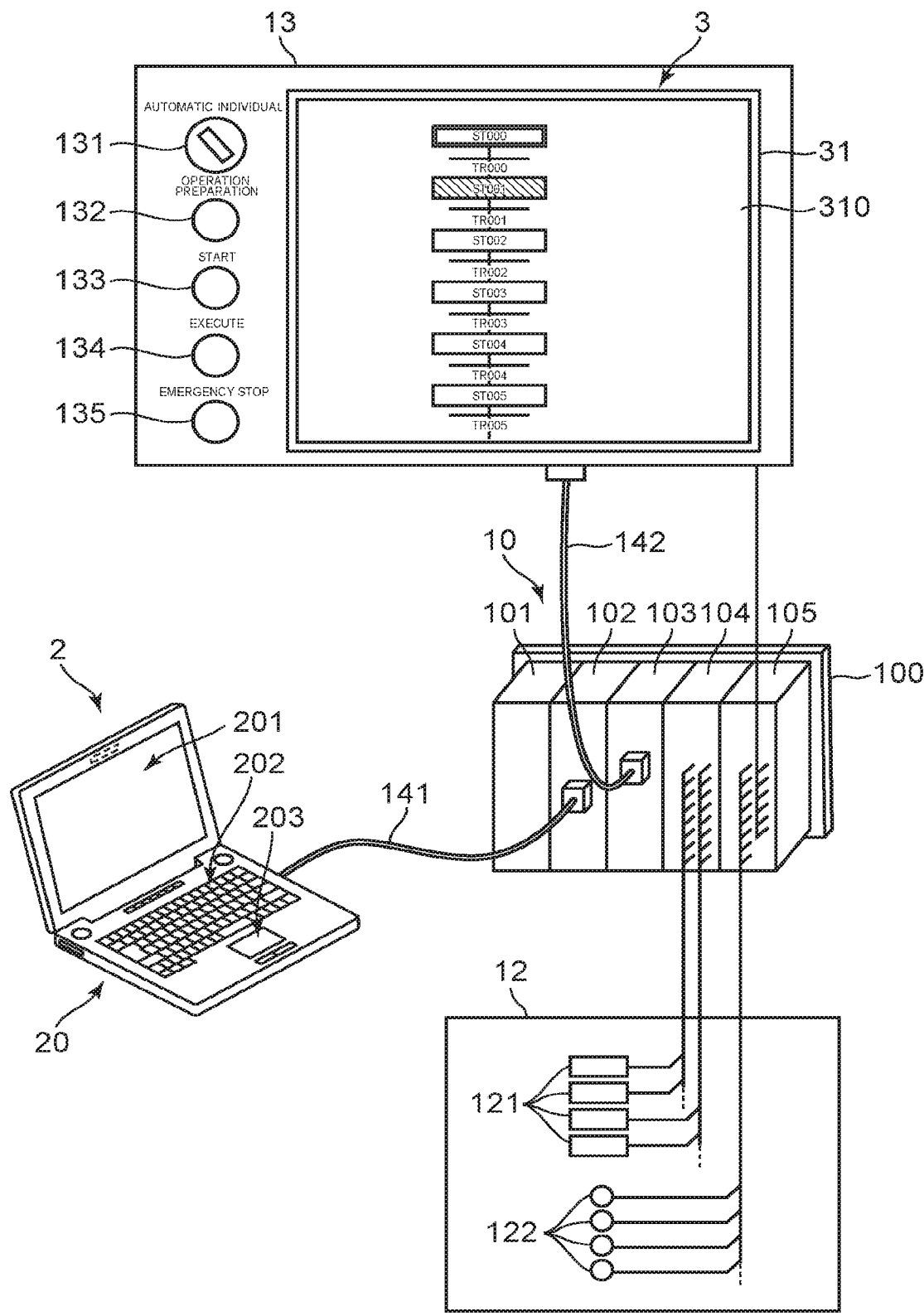
FIG. 1 is a configuration diagram showing a control program editing device according to an embodiment of the invention, along with a programmable controller, a facility, and an operation panel.

FIG. 1 is a configuration diagram showing a computer 2 that functions as a screen information generation device according to an embodiment of the invention, along with a programmable controller 10, a facility 12 as a control object device, and an operation panel 13 including a monitor device 3 as a display device._

In this embodiment, the computer 2 is constituted by a portable computer (notebook personal computer) including a body unit 20 having a MPU (micro-processing unit) and its peripheral circuits, a display 201 as a display unit, a keyboard 202 as a character input unit, and a touch pad 203 as a pointing device. However, the configuration of the computer 2 is not limited thereto and, for example, may be constituted by a combination of a stationary computer (desktop personal computer) and its peripheral devices such as a display, a keyboard, and a pointing device.

The computer 2 has a function to edit a control program to be executed by the programmable controller 10 and a function to generate screen information indicating display content of the monitor device 3. The control program edited by the computer 2 is transferred to the programmable controller 10 via a communication cable 141. This control program includes a chart program described by an SFC language and ladder programs by a ladder language assigned to later-described steps and transitions of the chart program. The SFC language and the ladder language are defined in the IEC61131-3 standard.

The screen information generated by the computer 2 is transferred to an internal storage device of the monitor device 3 via a removable storage medium such as a USB memory. Alternatively, the screen information generated by the computer 2 may be transferred to the monitor device 3 via communication. Based on the transferred screen information, the monitor device 3 displays on a display 31 a plurality of kinds of screens such as an operating state display screen that displays an operating state of the facility, and an individual-manipulation screen for carrying out an individual manipulation that individually operates the facility per operation unit.

The programmable controller 10 includes a power supply module 101, a CPU module 102, a communication module 103, an output module 104, an input module 105, and a base 100 on which these modules are mounted. The power supply module 101 supplies power to the CPU module 102 and so on via the base 100. The communication module 103 performs communication with the monitor device 3 of the operation panel 13.

The output module 104 has a plurality of output contacts connected to a plurality of actuators 121 provided in the facility 12. The actuators 121 are each in the form of, for example, a solenoid, a motor, or an electromagnetic switching valve that controls the oil pressure. The input module 105 has a plurality of input contacts that turn on/off in response to input signals from a plurality of sensors 122 provided in the facility 12. The sensors 122 are each in the form of, for example, a proximity sensor, a photoelectric sensor, or a limit switch.

The CPU module 102 executes the control program edited by the computer 2 and controls the facility 12 by turning on/off the output contacts of the output module 104 according to the states of the input contacts of the input module 105 and so on. In this embodiment, it is assumed that the facility 12 is a machine tool and attaches a predetermined component to a carried work.

The operation panel 13 includes the monitor device 3, an automatic/individual selection switch 131, an operation preparation switch 132, a start switch 133, an execution switch 134, and an emergency stop switch 135. The automatic/individual selection switch 131 is a switch for switching between an automatic operation mode that performs a continuous operation according to the control program edited by the computer 2 and an individual-manipulation mode that causes the actuators 121 of the facility 12 to perform individual operations. The operation preparation switch 132 is a switch for causing the actuators 121 of the facility 12 to be operable. The start switch 133 is a switch for instructing the start of an automatic operation. The execution switch 134 is a switch for instructing the execution of individual operations in the individual-manipulation mode. The emergency stop switch 135 is a switch for instantly stopping the operation of the facility 12. These switches 131 to 135 are connected to the input module 105 of the programmable controller 10.

In the automatic operation mode, an operating state display screen that indicates execution states of the steps of the chart program by the programmable controller 10 is displayed on the display 31 of the monitor device 3. In the individual-manipulation mode, a plurality of operation buttons indicating individual operations that can be performed by the facility 12 are displayed on the display 31 of the monitor device 3. FIG. 1 shows a state in which the operating state display screen is displayed on the monitor device 3.

The display 31 of the monitor device 3 is a touch panel. When an operator such as a person in charge of the maintenance of the facility 12 pushes the button displayed on the display 31 in the individual-manipulation mode, it is possible to cause the facility 12 to perform the individual operation corresponding to the pushed button. This individual manipulation is carried out, for example, in restoration work when some abnormality has occurred during the continuous operation of the facility 12 in the automatic operation mode.

The monitor device 3 is connected to the communication module 103 of the programmable controller 10 via a communication cable 142 so that, whenever necessary, the monitor device 3 can read on/off states of the output contacts of the output module 104, on/off states of the input contacts of the input module 105, and on/off states of various flags stored in the CPU module 102. The monitor device 3 can also read from the programmable controller 10 the control program stored in the CPU module 102. In the automatic operation mode, the monitor device 3 displays the execution state of the control program by the CPU module 102 of the programmable controller 10 on the display 31 whenever necessary.

The chart program edited by the computer 2 is described including a plurality of steps each provided per operation unit of the facility 12 and a plurality of transitions each defining a transition condition between the steps. If the transition condition of the transition is satisfied, the execution of the chart program can proceed to the next step. In the chart program, its program unit is defined as a "process". In this process, the execution order (flow) of a plurality of steps is shown.

At least part of a plurality of steps included in one process form a step pair including a normal-operation step that operates a movable part of the facility 12 in one direction and an opposite-operation step that operates the movable part in the opposite direction. When seen from the normal-operation step, the opposite-operation step is a reverse-operation step. When seen from the opposite-operation step, the normal-operation step is a reverse-operation step. Usually, a plurality of step pairs are included in one process.

The ladder programs are assigned to the respective steps and transitions. The ladder program assigned to the step expresses specific operation content in this step by circuit elements including a plurality of contacts and a coil. The ladder program assigned to the transition expresses a transition condition between the steps by one or a plurality of contacts.

A coil and a contact can be considered as constituent elements of one relay. That is, according to conduction or non-conduction to the coil of the relay, the contact of this relay is turned on or off. There are "A contact" that is in an on-state during conduction to the coil and in an off-state during non-conduction to the coil, and "B contact" that is in an off-state during conduction to the coil and in an on-state during non-conduction to the coil. Further, there are a real relay incorporated in, for example, the output module 104 and a virtual internal relay for use in describing a ladder program.

Relays are respectively assigned addresses for identification. In this embodiment, a real relay is assigned an address starting with "Y" (e.g. such as "Y001" or "Y002"), while an internal relay is assigned an address starting with "M" (e.g. such as "M001" or "M002").

In a ladder program, a coil is an output element and a condition setting as to whether the coil is in a conducting state (active state) or in a non-conducting state (inactive state) is defined by one contact or a combination of a plurality of contacts. For example, when a condition for a real relay assigned an address of Y001 to be in a conducting state is satisfied, a contact (A contact) of this relay Y001 turns to an on-state and the actuator 121 of the facility 12 connected to this contact operates.

The monitor device 3 displays on the display 31 the step being executed by the CPU module 102 along with the steps before and after such a step. In this event, for example, by changing a display color, the monitor device 3 displays the step being executed by the CPU module 102 in such a manner as to be distinguishable from the other steps. In the example shown in FIG. 1, the step being executed by the CPU module 102 is indicated by hatching. Whether or not the operations of the respective steps have been executed can be judged by monitoring later-described executed contacts.

Figure 2:
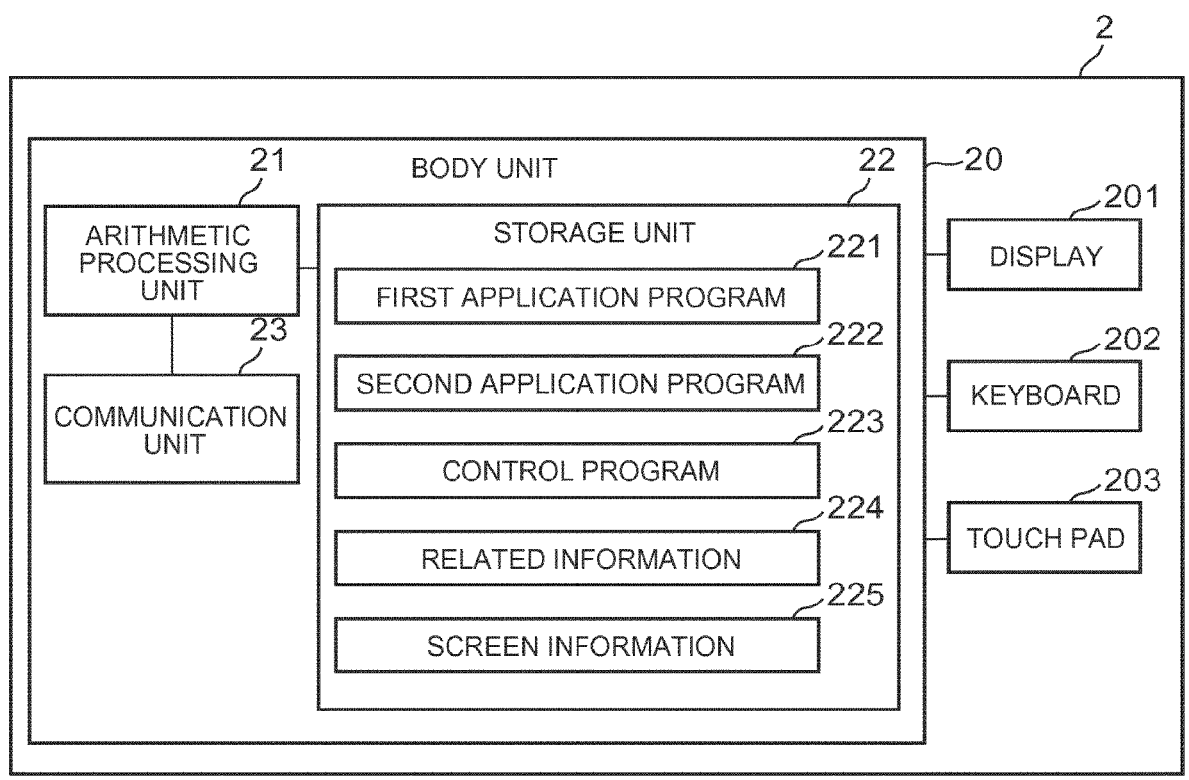
FIG. 2 is a block diagram showing a functional configuration of a computer.

FIG. 2 is a block diagram showing a functional configuration of the computer 2. The computer 2 includes the body unit 20, the display 201, the keyboard 202, and the touch pad 203. The body unit 20 includes an arithmetic processing unit 21 having a MPU (micro-processing unit) and its peripheral circuits, a storage unit 22 having a storage medium such as a hard disk or a semiconductor storage element, and a communication unit 23 that performs communication with the programmable controller 10.

The storage unit 22 stores therein a first application program 221 for editing the control program and a second application program 222 for realizing the function of generating the screen information. The first and second application programs 221 and 222 are installed in the computer 2 in advance and executed by the arithmetic processing unit 21. When the arithmetic processing unit 21 executes the first application program 221, the computer 2 functions as a control program editing device, while when the arithmetic processing unit 21 executes the second application program 222, the computer 2 functions as a screen information generation device.

Further, the storage unit 22 stores therein a control program 223 and related information 224 of the chart program, which was set by a programmer when creating the control program 223. The control program 223 is a program for controlling the facility 12 created by the programmer operating the computer 2 that functions as the control program editing device, and includes the foregoing chart program and ladder programs. The related information 224 is related information of the chart program, which was set by the programmer when creating the chart program.

In addition, the storage unit 22 stores therein screen information 225 generated by the execution of the second application program 222 by the arithmetic processing unit 21. The screen information 225 is transferred to the monitor device 3.

Figure 3:
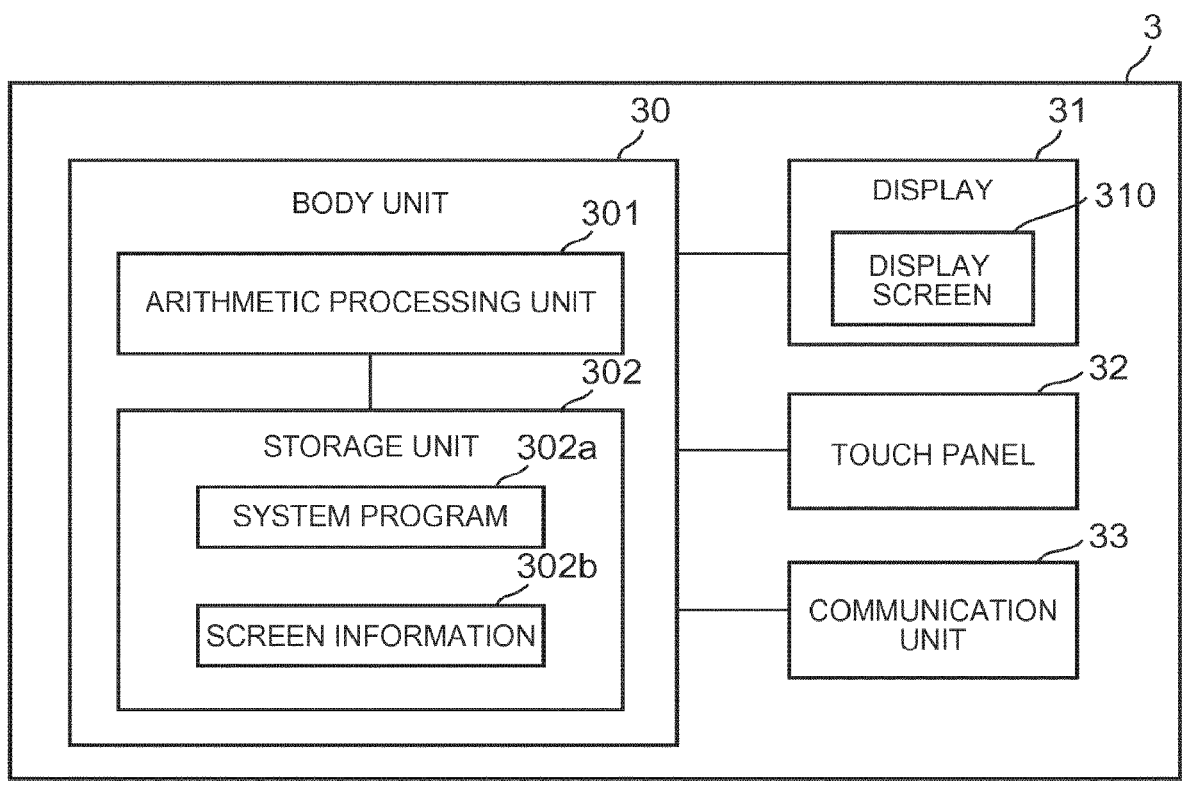
FIG. 3 is a block diagram showing a functional configuration of a monitor device.

FIG. 3 is a block diagram showing a functional configuration of the monitor device 3. The monitor device 3 includes a body unit 30, the display 31, a touch panel 32, and a communication unit 33 for performing communication with the communication module 103 of the programmable controller 10. The body unit 30 includes an arithmetic processing unit 301 and a storage unit 302.

The display 31 is, for example, a liquid crystal display or a plasma display and displays an image on a display screen 310 according to an image signal based on an operation result of the arithmetic processing unit 301. The storage unit 302 stores therein a system program 302a to be executed by the arithmetic processing unit 301 and screen information 302b transferred from the computer 2. The arithmetic processing unit 301 executes the system program 302a by referring to the screen information 302b in the individual manipulation and outputs screen information to the display 31.

The touch panel 32 is formed by disposing many touch sensor elements on a base member made of a light-transmissive sheet-like resin and is superimposed on the display 31. When the operator touches the touch panel 32, the arithmetic processing unit 301 can recognize a touch position based on a detection signal of the touch sensor element. The communication unit 33 performs communication with the communication module 103 of the programmable controller 10 by, for example, the Ethernet (registered trademark) protocol.

Figure 4:
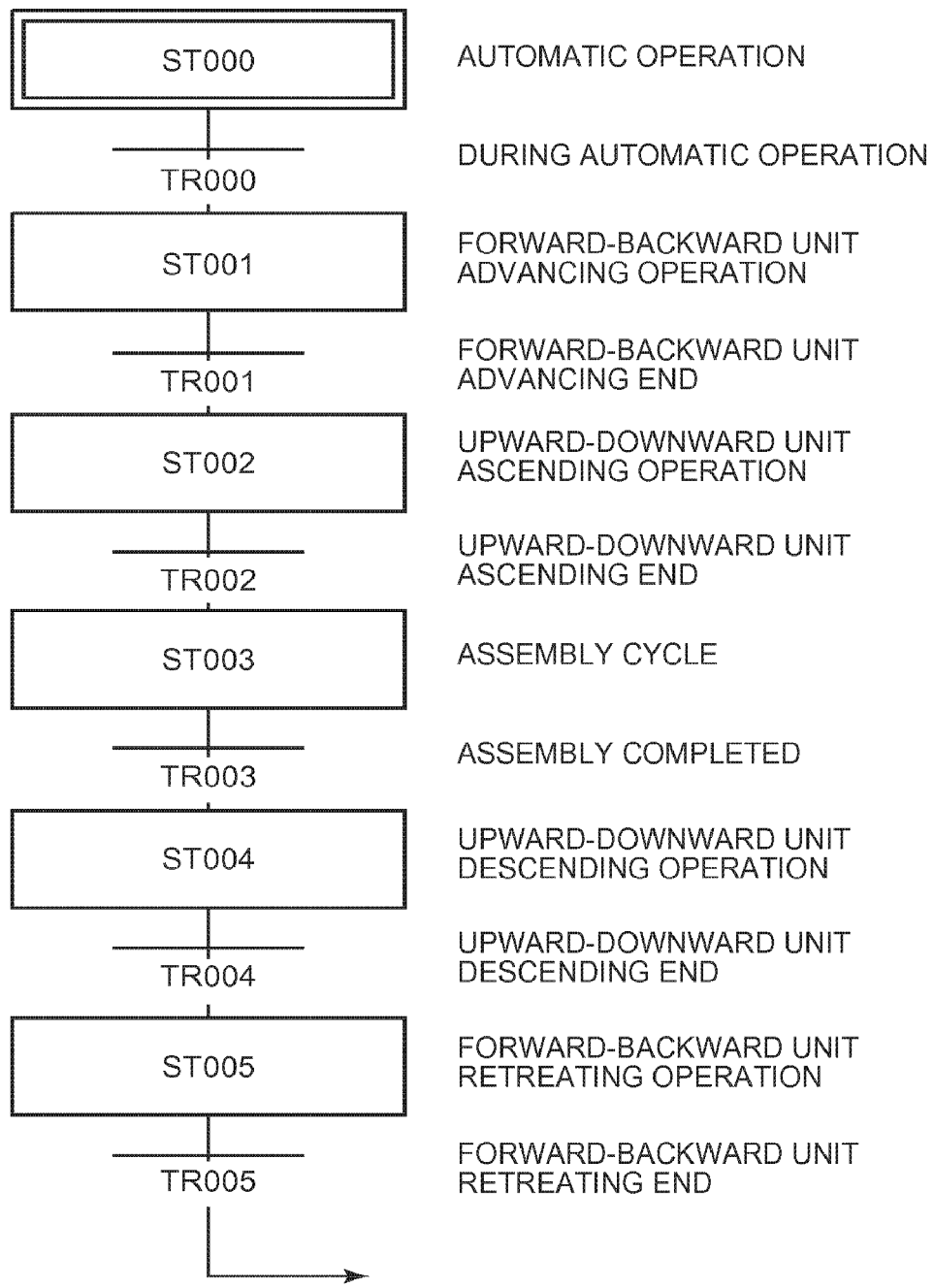
FIG. 4 is an explanatory diagram showing a specific example of a chart program.

FIG. 4 shows a specific example of one process of the chart program in the control program 223 stored in the storage unit 22 of the computer 2. This chart program is described according to the IEC61131-3 standard by alternately arranging a plurality of steps each indicating an individual control process and a plurality of transitions each indicating a transition condition between the steps. "ST000" as the first step of the chart program is a step indicating an automatic cycle that performs a continuous operation of the facility 12 in the automatic operation mode. From the start of the automatic operation, the programmable controller 10 executes the control processes of the steps in sequence from "ST000" at the most upstream of the chart program toward its downstream side.

The chart program shown in FIG. 4 is configured to execute in sequence the control processes of the steps of Forward-Backward Unit Advancing Operation (ST001), Upward-Downward Unit Ascending Operation (ST002), Assembly Cycle (ST003), Upward-Downward Unit Descending Operation (ST004), and Forward-Backward Unit Retreating Operation (ST005). Herein, ST000 to ST005 are step numbers of the steps.

In this process, the step of Forward-Backward Unit Advancing Operation (ST001) is a normal-operation step that operates a forward-backward unit being a movable part of the facility 12 in one direction (advancing direction), while the step of Forward-Backward Unit Retreating Operation (ST005) is an opposite-operation step that operates the forward-backward unit in the opposite direction (retreating direction). Further, the step of Upward-Downward Unit Ascending Operation (ST002) is a normal-operation step that operates an upward-downward unit being a movable part of the facility 12 in one direction (ascending direction), while the step of Upward-Downward Unit Descending Operation (ST004) is an opposite-operation step that operates the upward-downward unit in the opposite direction (descending direction).

The step of Forward-Backward Unit Advancing Operation (ST001) and the step of Forward-Backward Unit Retreating Operation (ST005) form one step pair. Likewise, the step of Upward-Downward Unit Ascending Operation (ST002) and the step of Upward-Downward Unit Descending Operation (ST004) form one step pair. That is, this process includes two step pairs.

FIG. 5 is an explanatory diagram showing one example of the content of the related information 224 stored in the storage unit 22 of the computer 2.

The related information 224 includes a comment which is character information indicating operation content of a step, address information of an executed contact indicating that the operation of the step has been executed, and a step number of a reverse-operation step. The executed contact is a contact of a real relay for causing the facility 12 to perform the operation of the step. That is, by monitoring the executed contact, it is possible to judge whether or not the operation of the step in the facility 12 has been executed. The content of the related information 224 is set by the programmer performing an input operation to a dialog box displayed on the display 201 of the computer 2 when creating the chart program.

FIG. 6 is an explanatory diagram showing one example of this dialog box. In FIG. 6, a dialog box 240 for inputting the related information 224 about the step of Forward-Backward Unit Advancing Operation (ST001) is shown by way of example.

The dialog box 240 includes a comment column 241 for inputting a comment indicating operation content of the step (ST001), an address input column 242 for inputting an address of an executed contact, and a pull-down menu column 243 for selecting a reverse operation step. The programmer enters a comment indicating operation content of a step in the comment column 241, enters an address of an executed contact in the address input column 242, and selects a reverse operation step from a pull-down menu of the pull-down menu column 243. Thereafter, when the programmer clicks an OK button 244 of the dialog box 240, the contents input and selected in the comment column 241, the address input column 242, and the pull-down menu column 243 of the dialog box 240 are fixed and stored as the related information 224 in the storage unit 22. When there is no reverse operation step, an operation of selecting a reverse operation step from the pull-down menu is not necessary.

Next, a description will be given of processing content when the computer 2 functions as the screen information generation device. In the computer 2, when the arithmetic processing unit 21 is instructed to execute the second application program 222 by, for example, an operation of the keyboard 202 or the touch pad 203 by the programmer, it automatically generates the screen information 225 configured to display an individual-manipulation screen on the display 31 in the individual-manipulation mode.

FIG. 7 shows one example of an individual-manipulation screen that is displayed on the display screen 310 of the display 31 based on the screen information 225 generated by the execution of the second application program 222 by the arithmetic processing unit 21.

As shown in FIG. 7, a plurality of operation buttons 40 indicating individual operations that can be performed by the facility 12 are displayed in an individual-manipulation screen 310a in a checkerboard pattern (in a matrix). In FIG. 7, there is shown a case where five operation buttons 40 are displayed on the display screen 310. In the following description, if it is necessary to distinguish between these five operation buttons, the respective operation buttons 40 will be described as first to fifth operation buttons 41 to 45.

The first to fifth operation buttons 41 to 45 respectively correspond to the steps (ST001 to ST005) in the chart program. Specifically, the first operation button 41 corresponds to the step of step number ST001 and, likewise, the second to fifth operation buttons 42 to 45 respectively correspond to the steps of step numbers ST002 to ST005.

The comments indicating the operation contents of the steps each entered in the comment column 241 of the dialog box 240 are respectively displayed in display areas of the first to fifth operation buttons 41 to 45. By these comments, the operator can grasp the respective operation contents of the first to fifth operation buttons 41 to 45.

When carrying out an individual manipulation of the facility 12, the operator selects one of the five operation buttons 40 by touching the touch panel 32 in a range corresponding to the display area of a corresponding one of the first to fifth operation buttons 41 to 45 displayed on the display screen 310 (hereinafter, this operation will be referred to as a "touch operation"), and then pushes the execution switch 134 of the operation panel 13.

When the arithmetic processing unit 301 of the monitor device 3 recognizes that one of the operation buttons 40 has been selected by the touch operation of the operator, the arithmetic processing unit 301 sends to the display 31 an image signal that displays the selected operation button 40 in such a manner as to be distinguishable from the other operation buttons 40 by, for example, enclosing the selected operation button 40 with a red frame and further transmits via the communication unit 33 an instruction signal indicating that a contact of an internal relay, corresponding to the selected operation button 40, of the programmable controller 10 should be set to an on-state.

In response to receipt of this instruction signal, the programmable controller 10 sets the contact of the corresponding internal relay to an on-state. Then, when the execution switch 134 is pushed thereafter, the operation per operation unit of the step corresponding to the selected operation button 40 is performed in the facility 12. This processing is achieved by the processing of the ladder program corresponding to the step.

For example, when the operator performs a touch operation to the first operation button 41 and pushes the execution switch 134, the forward-backward unit advancing operation as the operation of the step ST001 is performed in the facility 12. Regardless of the execution order of the steps set in the chart program, the operator can select an arbitrary one of the operation buttons 40 displayed on the display screen 310. However, in terms of safety on the operation of the facility 12, there are cases where the selected operation is not executed by interlock set in the ladder program.

Based on the chart program of the control program 223 stored in the storage unit 22, the computer 2, as the screen information generation device, generates the screen information 225 configured to display on the display 31 of the monitor device 3 the first to fifth operation buttons 41 to 45 that respectively correspond to the steps (ST001 to ST005). The screen information 225 includes the information of the comments indicating the operation contents of the respective steps. That is, the computer 2 generates the screen information 225 configured to display on the display 31 of the monitor device 3 the operation buttons 40 along with the comment information corresponding to the respective buttons 40.

FIG. 8 is an explanatory diagram showing one example of the content of the screen information 225 in a table format. In FIG. 8, a display position column 51 shows a display position of each operation button 40 in a display area of an individual-manipulation screen. In the example shown in FIG. 8, the display position of each operation button 40 is given by two numbers connected by a hyphen (-). Of these two numbers, the former indicates a row number of the display position and the latter indicates a column number of the display position.

A comment column 52 shows comment information indicating operation content of each operation button 40, while an address column 53 shows an address of an executed contact of a step corresponding to each operation button 40. The computer 2 acquires comment information indicating operation content for each step from the related information 224 stored in the storage unit 22 and generates comment information in the screen information 225 shown in the comment column 52. Further, the computer 2 acquires an address of an executed contact indicating an execution state for each step from the related information 224 stored in the storage unit 22 and generates address information in the screen information 225 shown in the address column 53.

As shown in FIG. 7, the first operation button 41 corresponding to the step of Forward-Backward Unit Advancing Operation (ST001) and the fifth operation button 45 corresponding to the step of Forward-Backward Unit Retreating Operation (ST005), which form a step pair, are arranged adjacent to each other. Likewise, the second operation button 42 corresponding to the step of Upward-Downward Unit Ascending Operation (ST002) and the fourth operation button 44 corresponding to the step of Upward-Downward Unit Descending Operation (ST004), which form a step pair, are arranged adjacent to each other. In the example shown in FIG. 7, the first operation button 41 and the fifth operation button 45 belong to the same column and are arranged side by side vertically, while the second operation button 42 and the fourth operation button 44 belong to the same column and are arranged side by side vertically.

That is, the computer 2, as the screen information generation device, acquires information, that can specify a normal-operation step and an opposite-operation step among the steps of the chart program, from the related information 224 stored in the storage unit 22 and generates the screen information 225 such that the operation button 40 for performing the operation of the normal-operation step and the operation button 40 for performing the operation of the opposite-operation step are displayed adjacent to each other. This improves convenience of the operator who carries out an individual manipulation. That is, in restoration work when some abnormality has occurred during a continuous operation of the facility 12 in the automatic operation mode, there are cases where the operation of a normal-operation step and the operation of an opposite-operation step are repeatedly performed, and therefore, if the operation button 40 for performing the operation of the normal-operation step and the operation button 40 for performing the operation of the opposite-operation step are displayed adjacent to each other, it is possible to quickly select the target operation buttons 40.

Further, the computer 2, as the screen information generation device, generates the screen information 225 such that the operation button 40 for performing the operation of a normal-operation step and the operation button 40 for performing the operation of an opposite-operation step are displayed in different display manners. Specifically, for example, background colors of the operation button 40 of the normal-operation step and the operation button 40 of the opposite-operation step are made different from each other. For example, the operation buttons 40 corresponding to the step of Forward-Backward Unit Advancing Operation (ST001) and the step of Upward-Downward Unit Ascending Operation (ST002), which are normal-operation steps, are displayed with a background color of white, while the operation buttons 40 corresponding to the step of Upward-Downward Unit Descending Operation (ST004) and the step of Forward-Backward Unit Retreating Operation (ST005), which are opposite-operation steps, are displayed with a background color of green. Consequently, it is possible to suppress the occurrence of selection error of the operation button 40 and thus to reduce the burden of the operator.

On the other hand, the monitor device 3 can read an execution state of the operation of a step corresponding to each operation button 40 from the programmable controller 10 and change the display manner of each operation button 40 according to the read execution state. This reading of the execution states is performed by referring to addresses of executed contacts of steps shown in the address column 53 of the screen information 225 shown in FIG. 8. That is, the screen information 225 includes address information (address information of executed contacts) indicating addresses which should be referred by the monitor device 3 when reading an execution state of the operation per operation unit from the programmable controller 10.

The monitor device 3 reads an on/off state of an address of an executed contact of each step from the programmable controller 10 at a predetermined time interval. If it is the off-state (unexecuted state), the monitor device 3 displays the operation button 40 of this step with a background color of, for example, gray. If it is the on-state (executed state), the monitor device 3 displays the operation button 40 of this step by, for example, alternately switching its background color between gray and white per second. Further, if the transition condition of a transition just below a step corresponding to the operation button 40 is satisfied, the monitor device 3 displays the operation button 40 of a normal-operation step with a background color of white and the operation button 40 of an opposite-operation step with a background color of green as described above.

By changing the display manner of the operation button 40 according to the execution state of the corresponding step, even in the case where, for example, the facility 12 is stopped on the way due to some abnormality during a continuous operation along the processing flow of the chart program, the operator can easily grasp in which process the facility 12 is stopped.

When determining arrangement positions of the operation buttons 40, the computer 2, as the screen information generation device, determines, along the execution order of the steps determined in the chart program, the operation buttons 40 corresponding to the respective steps in sequence. In this event, the arrangement positions of the operation buttons 40 are determined based on the following three rules, wherein the rule 3 is applied in preference to the rule 2.

Rule 1: An operation button 40 of a most upstream step in a chart program is arranged at an upper left corner (first row, first column) of an individual-manipulation screen.

Rule 2: Operation buttons 40 corresponding to steps from the upstream side toward the downstream side of a chart program are arranged in sequence from the left side toward the right side in the same row. When having reached a right end, if the whole of a row just below is empty, the operation button 40 is arranged at a left end of that row, while if the whole of a row just below is not empty, the operation button 40 is arranged at a left end of a row next to and below that row.

Rule 3: If there is a reverse-operation step (opposite-operation step) forming a pair with a step of an operation button 40 whose arrangement position is determined, an operation button 40 of the reverse-operation step is arranged at a position just below that operation button 40.

In the example shown in FIG. 7, the first operation button 41 is arranged at an upper left corner of the individual-manipulation screen 310a according to the rule 1, the second operation button 42 is arranged right next to the first operation button 41 according to the rule 2, and the third operation button 43 is arranged right next to the second operation button 42 according to the rule 2. Further, the fourth operation button 44 is arranged just below the second operation button 42 according to the rule 3 and the fifth operation button 45 is arranged just below the first operation button 41 according to the rule 3.

If there are a plurality of operation buttons 40 following the fifth operation button 45 and the operation button 40 is arranged up to a right end in the first row, the next operation button 40 is arranged in the third row, first column. That is, according to the rule 2, the operation button 40 that turns back from the right end of the first row is not newly arranged in the row (second row) where the operation buttons 40 (the fourth operation button 44 and the fifth operation button 45) corresponding to the reverse-operation steps are already arranged.

According to the embodiment described above, since the computer 2, as the screen information generation device, determines the arrangement positions of the operation buttons 40, it is possible to reduce the workload when producing screen information of an individual-manipulation screen. Further, since the computer 2, as the screen information generation device, generates the screen information 225 including address information indicating addresses which should be referred by the monitor device 3 when reading an execution state of the operation per operation unit from the programmable controller 10, the workload when producing screen information of an individual-manipulation screen is further reduced.

What is claimed is:

1. A screen information generation device that generates screen information indicating display content of a display device connected to a programmable controller that controls a plurality of operations of a control object device according to a chart program indicating an execution order of a plurality of steps each corresponding to one of the plurality of operations, comprising:
    circuitry configured to:
        when generating an individual-manipulation screen for use in individually actuating the plurality of operations of the control object device, generate the screen information based on the chart program such that a plurality of operation buttons for causing the corresponding plurality of operations of the control object device to be performed at a time that they are selected are displayed on the display device, the plurality of operation buttons respectively corresponding to the plurality of steps, wherein at least part of the plurality of steps of the chart program is a step pair including:
        a normal-operation step that operates a movable part of the control object device in one direction including at least one of an advancing step and an ascending step; and
        an opposite-operation step that operates the movable part in a direction that is opposite to the one direction including at least one of a retreating step and a descending step, and the circuitry is configured to:
    acquire information that specifies the normal-operation step including the at least one of the advancing step and the ascending step and the opposite-operation step including the at least one of the retreating step and the descending step in the plurality of steps; and
    generate the screen information such that:
        the plurality of operation buttons include (1) an operation button for causing the movable part of the control object device to perform an operation corresponding to the normal-operation step including the at least one of the advancing step and the ascending step at the time it is selected and (2) an operation button for causing the movable part of the control object device to perform an operation corresponding to the opposite-operation step including the at least one of the retreating step and the descending step at the time it is selected, and (1) and (2) are displayed adjacent to each other.

2. The screen information generation device according to claim 1, wherein the circuitry is configured to:
    acquire comment information indicating operation content of each of the steps; and
    generate the screen information such that the comment information is displayed on the display device along with the plurality of operation buttons.

3. The screen information generation device according to claim 2, wherein the circuitry is configured to acquire the comment information from related information of the chart program set by a programmer when creating the chart program.

4. The screen information generation device according to claim 1, wherein the circuitry is configured to acquire the information that specifies the normal-operation step including the at least one of the advancing step and the ascending step and the opposite-operation step including the at least one of the retreating step and the descending step from related information of the chart program set by a programmer when creating the chart program.

5. The screen information generation device according to claim 1, wherein the circuitry is configured to generate the screen information such that (1) the operation button for performing the operation of the normal-operation step including the at least one of the advancing step and the ascending step and (2) the operation button for performing the operation of the opposite-operation step including the at least one of the retreating step and the descending step are displayed in different display manners.

6. A system comprising:
    the screen information generation device according to claim 1; and
    the display device, wherein
    the display device is configured to read an execution state of operation of one of the plurality of operations from the programmable controller and change a display manner of a corresponding operation button according to the execution state read, and
    the screen information includes address information indicating an address of the programmable controller that should be referred to by the display device when reading the execution state from the programmable controller.

7. The screen information generation device according to claim 1, wherein the circuitry includes a storage unit and an arithmetic processing unit, the storage unit stores therein:

an application program for generating the screen information, the chart program; and related information of the chart program, and the arithmetic processing unit is configured to generate the screen information by execution of the application program.

8. The screen information generation device according to claim 1, wherein the step pair includes step pairs including:

the advancing step and the retreating step, and the ascending step and the descending step, and the circuitry is configured to:

acquire information that specifies the advancing step, the retreating step, the ascending step, and the descending step; and generate the screen information such that:

the plurality of operation buttons include (a) operation buttons for causing the operations of the control object device corresponding to the advancing step and the ascending step to be performed, (b) an operation button for causing an operation to be performed that is not a part of the step pairs, and (c) operation buttons for causing the operations of the control object device corresponding to the retreating step and the descending step to be performed, (a) and (b) are displayed in a first row, and (c) are displayed in a second row below the first row.

9. The screen information generation device according to claim 8, wherein the circuitry is configured to generate the screen information such that (a) the operation buttons for causing the operations of the control object device corresponding to the advancing step and the ascending step to be performed are displayed in the first row from left to right according to the execution order of the plurality of steps.

10. The screen information generation device according to claim 1, wherein information of the normal-operation step including the at least one of the advancing step and the ascending step includes a position of the opposite-operation step including the at least one of the retreating step and the descending step in the execution order of the plurality of steps, and information of the opposite-operation step including the at least one of the retreating step and the descending step includes a position of the normal-operation step including the at least one of the advancing step and the ascending step in the execution order of the plurality of steps.

11. The screen information generation device according to claim 1, wherein the plurality of operations includes at least two of an advancing operation, a retreating operation, an ascending operation, a descending operation, and an assembly cycle.

12. The screen information generation device according to claim 1, wherein the plurality of operations includes an advancing operation, a retreating operation, an ascending operation, a descending operation, and an assembly cycle.

* * * * *